UNITED STATES PATENT OFFICE.

CHARLES H. LAND, OF DETROIT, MICHIGAN.

IMPROVEMENT IN COMPOSITION OF MATTER FOR VENEERS.

Specification forming part of Letters Patent No. 186,483, dated January 23, 1877; application filed May 27, 1876.

*To all whom it may concern:*

Be it known that I, CHARLES H. LAND, of Detroit, Wayne county, Michigan, have invented a new and Improved Composition of Matter, of which the following is a specification:

The object of this invention is to make an improvement in veneers by securing a composition which will be capable of vulcanization in the finishing process, whereby a great saving of labor may be effected, and a greater uniformity obtained in the outline of designs.

The invention will first be fully described, and then indicated in the claim.

The composition is as follows: Take three (3) pounds of whiting; add sufficient boiled linseed-oil to make into a stiff putty; then add of pure india-rubber or caoutchouc, one pound, and sufficient spirits of turpentine to make it into a very thick mass; also, coloring matter as desired, and also sulphur for vulcanizing; and then knead the mass together upon a warm table, or while otherwise exposed to a gentle heat, and roll out into sheets, as required.

The object of the whiting is to make a body of cheaper material than the caoutchouc or rubber, and the oil is to dissolve the rubber and combine the whiting with it. Any other substance that will combine readily with the rubber and cheapen the mass without interfering with its hardness and flexibility may be used; and I do not limit myself to whiting, nor to the proportions stated.

Having thus described my invention, I claim as new and desire to secure by Letters Patent—

A composition of matter consisting of whiting, linseed-oil, rubber, turpentine, and sulphur, in the proportions and for the purpose specified.

CHARLES H. LAND.

Witnesses:
GEO. W. MOORE,
H. H. BRONSON.